US005335494A

United States Patent [19]

Benko et al.

[11] Patent Number: 5,335,494

[45] Date of Patent: Aug. 9, 1994

[54] HYDRAULIC SYSTEM FOR REEL MOWER VEHICLES

[75] Inventors: Andrew T. Benko; James A. Swartzendruber, both of West Bend; John L. Bocksnick, Beaver Dam, all of Wis.; Gary W. Clark, Savage, Minn.

[73] Assignee: Deere & Company, Moline, Ill.

[21] Appl. No.: 6,897

[22] Filed: Jan. 21, 1993

[51] Int. Cl.[5] .............. F16D 31/02

[52] U.S. Cl. .............. 60/428; 60/486

[58] Field of Search .............. 60/428, 486, 429, 430, 60/487

[56] References Cited

U.S. PATENT DOCUMENTS

| | | | |
|---|---|---|---|
| 3,032,994 | 5/1962 | Lindell | 60/486 |
| 3,360,925 | 1/1968 | Zimmerman | 60/429 |
| 3,785,157 | 1/1974 | Kittle et al. | 60/493 |
| 3,913,453 | 10/1975 | Parquet | 91/420 |
| 3,915,068 | 10/1975 | Gasman | 91/420 |
| 3,952,510 | 4/1976 | Peterson | 60/429 X |
| 4,367,624 | 1/1983 | Ogata et al. | 60/486 X |
| 4,531,368 | 7/1985 | Killen | 60/453 |
| 4,631,980 | 12/1986 | Ishimori | 74/730 |
| 5,069,037 | 12/1991 | Sakigawa et al. | 60/486 X |
| 5,101,627 | 4/1992 | Fuji et al. | 60/486 X |

FOREIGN PATENT DOCUMENTS

0386591B1 2/1990 European Pat. Off. .

*Primary Examiner*—Edward K. Look
*Assistant Examiner*—Hoang Nguyen

[57] ABSTRACT

A hydraulic system for a vehicle adapted for operating a plurality of reel mower cutting units and for driving at least one vehicle component such as drive wheels or power steering. The vehicle carries an engine near the front of the vehicle which generates heat. The system includes a fluid reservoir located remote from the engine and near the rear of the vehicle. An input line is coupled with the reservoir, and a first pump is operatively coupled with the input line. A first motor receives fluid from the first pump for driving a reel mower, and a branched line having first and second branches receives fluid from the first motor. The first branch is a first return line extending to the reservoir. A second pump having a lower capacity than the first pump is operatively coupled with the second branch, and a second motor receives fluid from the second pump for driving the vehicle component. A second return line receives fluid from the second motor and is coupled with the input line for allowing fluid from the second motor to flow to the first pump without first flowing to the reservoir.

28 Claims, 2 Drawing Sheets

HYDRAULIC SYSTEM FOR REEL MOWER VEHICLES

BACKGROUND OF THE INVENTION

This invention relates to hydraulic systems for vehicles having reel mower cutting units.

Reel mowers are typically used to mow grass in well groomed areas such as golf courses. Some vehicles which are adapted for operating reel mowers include a hydraulic system which powers the reel mowers and also the vehicle's drive wheels. These hydraulic systems typically include a fluid reservoir which stores and recirculates hydraulic fluid. The reservoir can generally cool the fluid stored therein and thereby maintain fluid in the system at sufficiently low temperatures during operation.

One type of conventional reel mower vehicle includes reel mower cutting units located at the front of the vehicle, which allows the cutting units to mow grass before the vehicle wheels trample or compress the grass. A hydraulic gear pump is positioned near the front portion of the vehicle for powering the cutting units. A charge pump, hydraulic pump and hydrostatic system are also carried near the front portion of the vehicle for powering the vehicle's ground engaging drive wheels. Fluid within the hydraulic system becomes heated under operational loads. Also, many of the hydraulic components and lines are positioned within or relatively close to the warm engine compartment located near the front portion of the vehicle, which further heats the hydraulic fluid flowing in the system. Once the hydraulic fluid has passed through the pumps and other hydraulic componentry it is routed back to the reservoir via a common return line. Conventional hydraulic systems typically position the reservoir near the front portion of the vehicle, and relatively close to or within the engine compartment in order to make the vehicle relatively compact. The reservoir's close proximity to the warm engine can generally hinder the fluid within the reservoir from cooling. A hydraulic fluid cooler may therefore be necessary, adding further expense to the vehicle.

The gear pump which operates the reel mowers, and the hydrostatic pump which operates the drive wheels have different operating flow rates or capacities, and operate different vehicle components. The two pumps and their respective motors therefore generally act as separate systems. Many conventional systems connect the two pumps in parallel such that the two pumps draw fluid from the reservoir via a common input line. The parallel configuration of the two pumps allows each pump to draw the proper amount of fluid it requires from the reservoir via the common input line even though the pumps draw in fluid at different rates. Since the input line supplies both pumps with fluid, a relatively large amount of fluid must be drawn in from the reservoir through the input line.

Cavitation is a phenomenon which can occur when the pressure head in a hydraulic system is insufficient and the fluid is allowed to reach its vapor pressure. The combination of a long suction line and a pump with a marginal inlet vacuum is an ideal environment for cavitation to occur. When the hydraulic fluid is relatively cold, the fluid viscocity increases, making it more difficult for a pump to draw in fluid. Cavitation causes fluid to vaporize into vapor cavities which are carried with the flowing liquid. As cavities encounter a region of high pressure, they may collapse as the vapor condenses. This collapse is accompanied by intense pressures caused by fluid rushing in to fill the cavity where its momentum is converted into pressure from the impact of the walls of the cavity as they meet. Any boundry or wall containing the fluid in the vacinity of the collapse will be subjected to repeated and intense localized pressures, which may cause damage to components, pumps or fluid lines. Conventional reel mower hydraulic systems generally do not experience many pump cavitation problems. Most conventional reel mower hydraulic systems are relatively compact, and therefore do not include long hydraulic lines which would significantly contribute to problems of cavitation.

It would be desirable to provide a hydraulic system which operates a plurality of components such as reel mower cutting units and vehicle drive wheels, and which generally cools the hydraulic fluid in a reservoir while hindering or preventing the occurance of pump cavitation, even when operating at relatively low ambient temperatures.

SUMMARY OF THE INVENTION

The preferred embodiment of the present invention provides a hydraulic system for a vehicle adapted for operating reel mower cutting units. The hydraulic system includes a fluid reservoir positioned at the rear of the vehicle such that heat from the engine mounted at the front of the vehicle is generally prevented from being transferred to the fluid in the reservoir. The ability of the reservoir to cool fluid is thereby enhanced by the reservoir's remote location with respect to the warm engine.

According to the preferred embodiment, a gear pump for powering the reel mower units and a charge pump which feeds a plurality of vehicle components are located near the front portion of the vehicle. The gear pump and charge pump are operatively connected in series. An input line extends between the reservoir and the gear pump. The gear pump powers the reel mower motors. Fluid that has passed through the reel motors enters a branched line section. A first branch extends back to the reservoir for routing a portion of the fluid back to the reservoir. The second branch extends to the charge pump and serves to route a portion of the fluid thereto. The hydrostatic pump powers motors which drive the vehicle's ground engaging drive wheels. The hydrostatic pump operates as a generally seperate hydraulic circuit which the charge pump primes as fluid leaks from the hydrostatic pump's case drain.

The return line from the vehicle components receives the fluid from the hydrostatic case drain, and is coupled in fluid communication with the input line at a location between the grear pump and the reservoir such that the return fluid is not routed all the way back to the reservoir at the rear of the vehicle. Since the return fluid is routed to the input line adjacent the gear pump, only a relatively small amount of fluid must be drawn from the reservoir via the input line which extends all the way to the reservoir at the rear of the vehicle. Therefore, cavitation at low ambient temperatures, and also cavitation due to pressure drop in the input line due to a relatively long input line, is generally reduced.

The operating flow rates or capacities of the gear pump and charge pump are not equal. The gear pump has a higher operating flow rate than the charge pump, and therefore only a portion of the fluid which has passed through the reel motors will be accepted by the charge pump via the second branch. The remainder of the fluid will be directed through the first branch back to the reservoir. The difference in operating flow rates or capacities thereby generally insures that at least a portion of the fluid within the hydraulic circit is returning to the reservoir via the first branch to be cooled, and that at least some of the cooled fluid from the reservoir is being drawn into the hydraulic circuit for maintaining a sufficiently low fluid temperature in the circuit during operation.

DESCRIPTION OF THE PREFERRED EMBODIMENT

Figure 1:
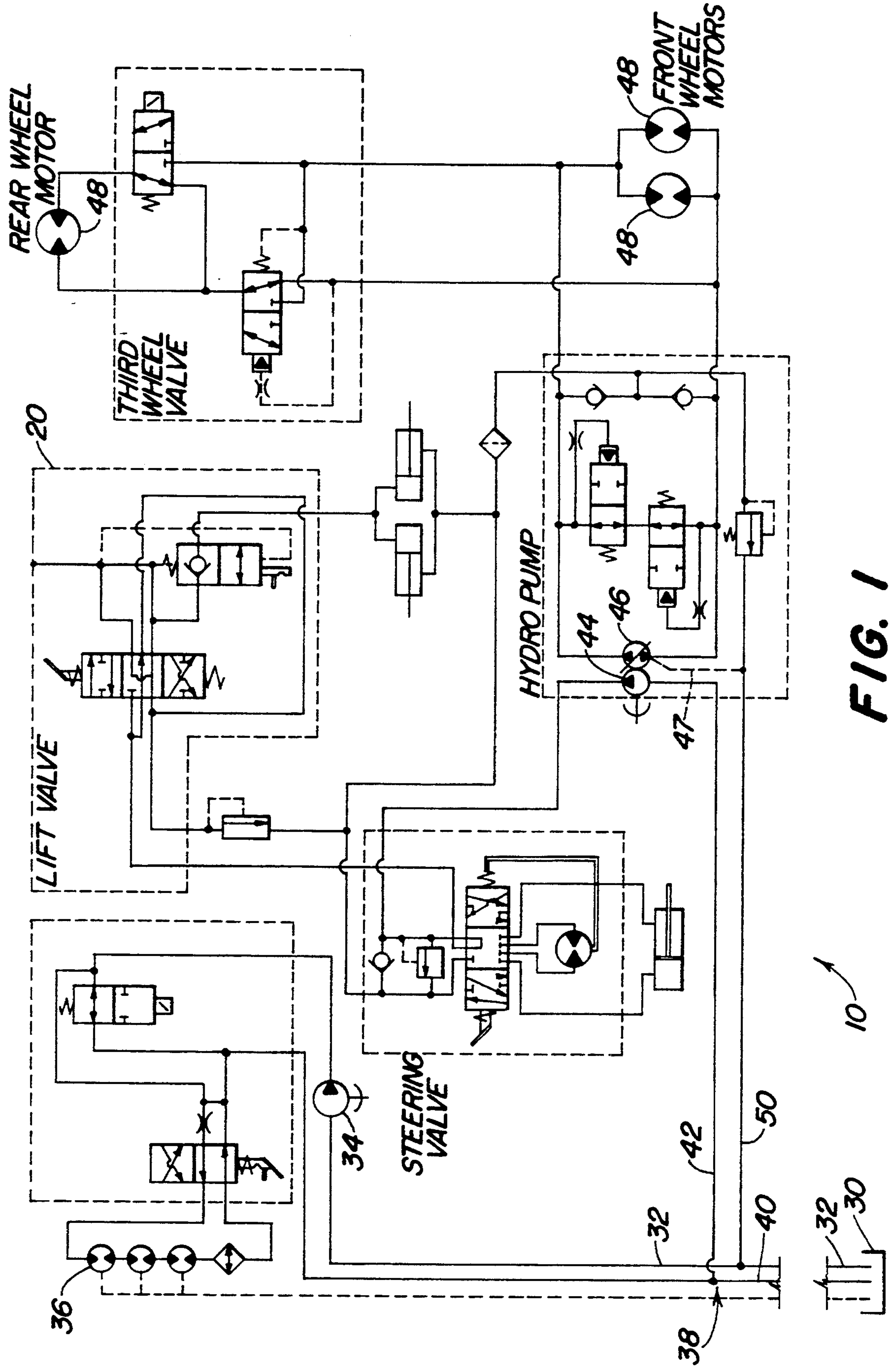
FIG. 1 is a schematic of a hydraulic circuit according to the preferred embodiment of the present invention.
Figure 2:
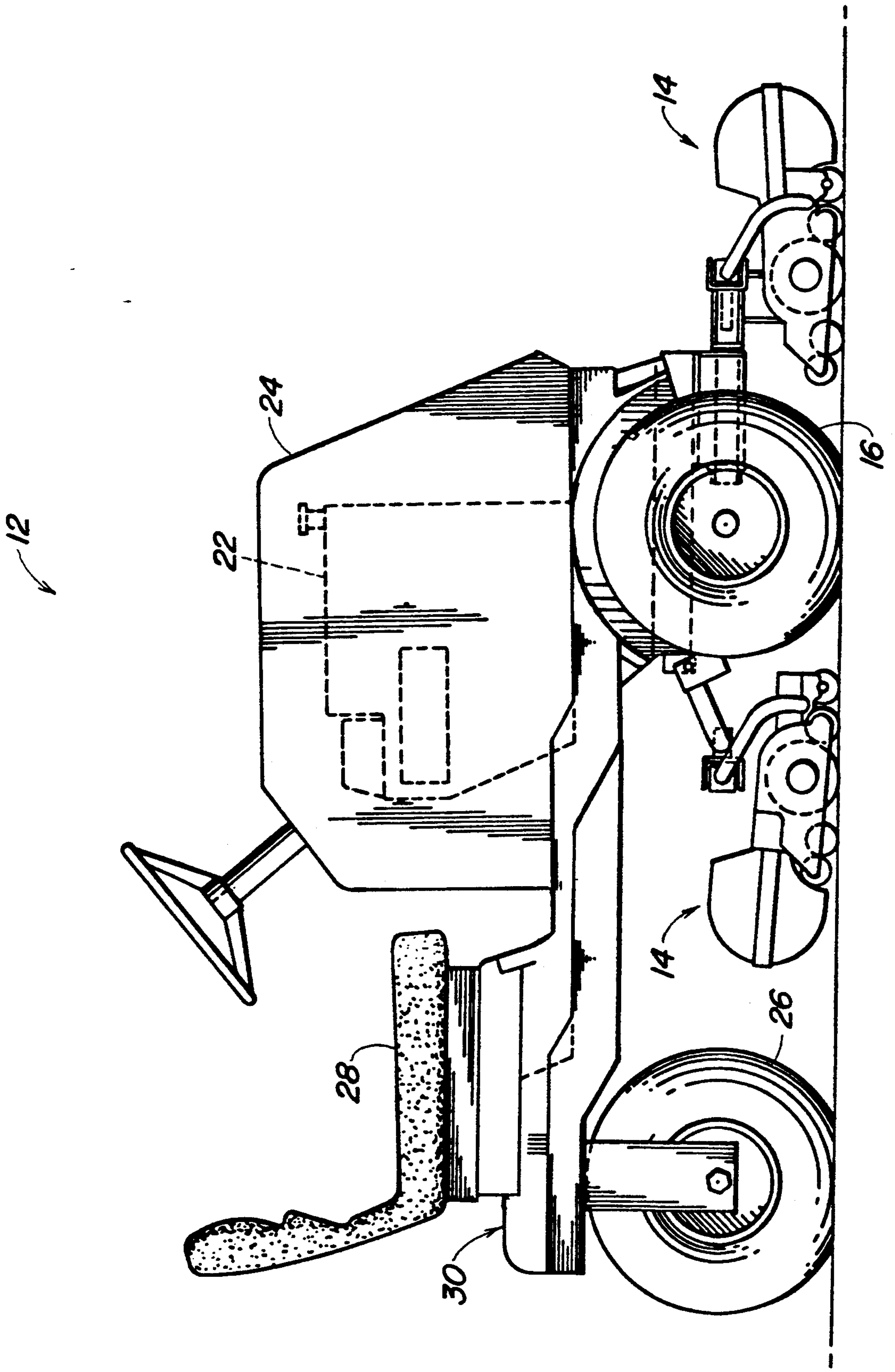
FIG. 2 is a schematic side view of a reel mower vehicle adapted for mowing golf courses.

Referring now to FIG. 1, there is shown a circuit diagram of the hydraulic system 10 according to the preferred embodiment of the present invention. The hydraulic system 10 shown is used on a vehicle 12 (seen in FIG. 2) adapted for operating a plurality of reel mower cutting units 14 typically used for mowing golf courses. The hydraulic system 10 drives the reel mowers 14, the vehicle's wheels 16 and 26, and other vehicle components such as the power steering mechanism 18 and the lift mechanism 20 which raises the reel mowers 14 to a transport mode. The vehicle 12 includes an engine 22 and engine compartment 24 located near the front of the vehicle 12 between the two front wheels 16.

The vehicle 12 according to the preferred embodiment has two driven front wheels 16 and a single driven rear wheel 26 which is steerable. The operator seat 28 is located generally above the rear steerable wheel 26. A reservoir 30 is positioned at the rear of the vehicle 12 generally between the operator seat 28 and the single rear wheel 26. An input line 32 (seen schematically in FIG. 1) extends forward from the reservoir 30 and is operatively coupled with a hydraulic gear pump 34 which is positioned near the front of the vehicle 12. The gear pump 34 draws fluid from the reservoir 30 via the input line 32 for driving the reel motors 36. The reel motors receive fluid from and are driven by the gear pump 34 and are carried on the reel mower cutting units 14 operated in front of the wheels 16 and 26. The fluid which has passed through the reel motors 36 flows into a branched line section 38. This branched line section 38 has first and second branches 40 and 42. The first branch 40 is a first return line which extends rearwardly to the reservoir 30 for returning a portion of the fluid to the reservoir 30 for cooling. The second branch line 42 extends to a charge pump 44 which feeds a hydrostatic pump 46. The hydrostatic pump 46 powers the drive wheels 16. Other vehicle components such as the power steering mechanism 18 and the lift mechanism 20 receive fluid from the charge pump 44. The fluid which has passed through the power steering mechanism 18, the lift mechanism 20 and the hydrostatic pump's case drain 47 flows into a second return line 50. The second return line 50 is coupled in fluid communication with the input line 32 between the gear pump 34 and the reservoir 30.

The hydrostatic pump 46 and wheel motors which drive the vehicle drive wheels 16 and 26 generally operate as a seperate system from the rest of the hydraulic circuit. The two systems are linked via the hydrostatic pump's case drain 47 which flows into the second return line, and also via the charge pump 44 which acts to force fluid into the hydrostatic pump's circuit to replace fluid which has leaked through case drain 47.

The second return line 50 routes return fluid from the power steering 18, lift mechanism 20 and case drain 47 to the input line 32 generally adjacent the gear pump 34, and therefore fluid is routed generally directly to the gear pump 34 without first routing the fluid all the way back to the reservoir 30. Since the gear pump 34 receives a portion of the fluid it requires from the second return line 50, only a relatively small amount of fluid is being drawn through the long input line 32 from the remote reservoir 30. Since a relatively small amount of fluid is drawn through the input line 32, there is relatively little cavitation caused by pressure drop in the input line 32 due to the long input line 32.

The system 10 is designed to route a portion of the fluid within the system back to the reservoir 30 to be cooled. The gear pump 34 has a higher operating flow rate or capacity than the charge pump 44. In other words, the gear pump 34 pumps a larger amount of fluid than the charge pump 44 is capable of pumping, such that the charge pump 44 can not accept all the fluid that the gear pump 34 is pumping. The charge pump 44 accepts a portion of the fluid pumped by the gear pump 34 via the second branch line 42. The fluid that the charge pump 44 does not draw in is routed into the first branch line 40, which returns fluid to the reservoir 30. The difference in pump capacities thereby insures that a portion of the fluid in the system 10 is routed back to the reservoir 30 via the first return line 40 for cooling.

Similarly, the difference in pump capacities insures that a portion of the fluid that the gear pump 34 draws in will come from the reservoir 30 via the input line 32. The charge pump 44 pumps a smaller amount of fluid than does the gear pump 34, and therefore the gear pump 34 requires more fluid than the charge pump 44 can supply via the second return line 50. Since only a portion of the fluid required by the gear pump 34 is supplied by the second return line 50, the remainder of the required fluid is drawn toward the gear pump 34 from the reservoir 30 via the input line 32. The difference in pump capacity therefore insures that at least a small amount of cool fluid from the remote reservoir 30 is being drawn in and circulated within the system 10 for maintaining a sufficiently low fluid temperature during operation.

In the preferred embodiment of the present invention, the reservoir 30 is located about one meter from the gear pump 34, and therefore the input line 32 is about one meter in length. The gear pump 34 has an operating capacity of 5.76 gal/min, or 0.37 cu.in./rev at an engine speed of 3600 rpm. The charge pump 44 has an output of 1.5 gal/min at 800 psi, and 4 gal/min at 50 psi. The hydrostatic pump 46 has an operating capacity of 12–18 gal/min.

The preferred embodiment of the present invention therefore provides a hydraulic system 10 with a fluid reservoir 30 which is positioned remote from the warm engine compartment 24 such that the fluid within the reservoir 30 is allowed to cool more effectively. The routing of the hydraulic lines between the gear pump 34 which drives the reel motors 36 and the charge pump 44 which drives the vehicle components 18, 20 acts to hinder cavitation by reducing the amount of fluid which must be drawn through the long input line 32 which extends to the reservoir 30. The hydraulic circuit of the present invention, in association with a gear pump 34 and charge pump 44 having different capacities as described above insures that a portion of the system's fluid is being directed into and drawn from the reservoir 30, such that the system 10 maintains a sufficiently low fluid temperature during operation, and insures that a positive hydraulic head is maintained at each pump inlet.

We claim:

1. A hydraulic system for a vehicle adapted for operating a plurality of components, said vehicle including a power source which generates heat, said hydraulic system comprising:

a fluid reservoir located generally remotely from the vehicle power source, an input line operatively coupled with the reservoir for drawing fluid therefrom, a first pump means operatively coupled with the input line for receiving fluid therefrom, a first driving means operatively coupled to receive fluid from the first pump means for driving a first vehicle component, a branched hydraulic line for receiving fluid from the first driving means, and having first and second branches, the first branch being a first return line extending to the reservoir, a second pump means operatively coupled with the second branch for receiving fluid therefrom, a second driving means operatively coupled for receiving fluid from the second pump for driving a second vehicle component, a second return line operatively coupled with the second driving means for receiving output fluid therefrom, said second return line being operatively coupled with the input line for allowing said output fluid from the second return line and second drive means to flow to the first pump means without first flowing to the reservoir.

2. The invention of claim 1, wherein the first pump has a higher operating flow rate than the second pump.

3. The invention of claim 2, wherein fluid is continuously directed through the first branch and the first return line for returning said fluid to the reservoir to be cooled.

4. The invention of claim 1, wherein the first vehicle component is a plurality of reel mower cutting units.

5. The invention of claim 1, wherein the vehicle is a front engine reel mover vehicle, said reservoir being located near the rear portion of the vehicle and remote from the vehicle's engine, said first and second pump means and said first and second drive means being located near the front portion of the vehicle.

6. A hydraulic system for a vehicle adapted for operating a plurality of reel mower cutting units and for driving at least one vehicle component, said vehicle including an engine carried near the front of the vehicle and which generates heat, said hydraulic system comprising:

a fluid reservoir located generally remotely from the engine and near the rear portion of the vehicle, an input line coupled with the reservoir for drawing fluid therefrom, a first pump means operatively coupled with the input line for receiving fluid therefrom, a first motor means operatively coupled for receiving fluid from the first pump means for driving a reel mower, a branched hydraulic line for receiving fluid from the first motor means, and having first and second branches, the first branch being a first return line extending to the reservoir, a second pump means operatively coupled with the second branch for receiving fluid therefrom, a second motor means operatively coupled for receiving fluid from the second pump means for driving said vehicle component, a second return line operatively coupled with the second motor means for receiving fluid therefrom, said second return line being operatively coupled with the input line for allowing said fluid from the second return line and second motor means to flow to the first pump means without first flowing to the reservoir.

7. The invention of claim 6, wherein the first pump means has a higher operating flow rate than the second pump means.

8. The invention of claim 7, wherein fluid is continuously directed through the first branch and the first return line for returning said fluid to the reservoir to be cooled.

9. The invention of claim 6, wherein the first and second pump means and the first and second motor means are carried near the front of the vehicle.

10. The invention of claim 6, wherein the second pump means is a charge pump, a hydrostatic pump carried by the vehicle is charged by the charge pump and drives at least one vehicle drive wheel and includes a case drain which directs fluid into the second return line.

11. The invention of claim 10, wherein the charge pump is operatively coupled with the hydrostatic pump for directing fluid thereto for replacing fluid which has passed through the case drain.

12. The invention of claim 6, wherein the second pump means is a charge pump, a hydrostatic pump is carried by the vehicle for driving at least one vehicle drive wheel, wherein the only operative connections between said hydrostatic pump and the rest of the hydraulic system are a case drain which directs fluid into the second return line, and an operative connection between the charge pump and the hydrostatic pump for directing fluid to the hydrostatic pump to replace fluid which has passed through the case drain.

13. A hydraulic system for a vehicle adapted for operating a plurality of components, said vehicle including a power source which generates heat, said hydraulic system comprising:

a fluid reservoir located generally remotely from the vehicle power source, an input line coupled with the reservoir for drawing fluid therefrom, a first pump means operatively coupled with the input line for receiving fluid therefrom, a first driving means operatively coupled downstream of the first pump means for driving a first vehicle component, a branched hydraulic line downstream of the first drive means for receiving fluid therefrom, and having first and second branches, the first branch being a first return line extending to the reservoir, a second pump means operatively coupled with the second branch and downstream of the first motor means, a second driving means operatively coupled downstream of the second pump for driving a second vehicle component, a second return line operatively coupled with the second driving means for receiving fluid therefrom, said second return line being operatively coupled with the input line downstream of the reservoir for allowing fluid from the second drive means to flow to the first pump means before flowing to the reservoir.

14. The invention of claim 13, wherein the first pump has a higher operating flow rate than the second pump.

15. The invention of claim 14, wherein the difference in operating flow rates causes fluid to be continuously directed through the first branch and the first return line for returning a portion of the fluid in the system to the reservoir to be cooled.

16. The invention of claim 13, wherein the first vehicle component is a plurality of reel mower cutting units, and the second vehicle component is a steering mechanism.

17. The invention of claim 13, wherein the vehicle is a front engine reel mower vehicle, and the reservoir is located near the rear portion of the vehicle and remote from the vehicle's engine.

18. The invention of claim 13, wherein the first and second pump means and the first and second motor means are carried near the front of the vehicle.

19. The invention of claim 16, wherein the second pump means is a charge pump, a hydrostatic pump carried by the vehicle is charged by the charge pump and drives at least one vehicle drive wheel and includes a case drain which directs fluid into the second return line.

20. The invention of claim 19, wherein the charge pump is coupled with the hydrostatic pump for directing fluid thereto for replacing fluid which has passed through the case drain.

21. The invention of claim 16, wherein the second pump means is a charge pump, a hydrostatic pump is carried by the vehicle for driving at least one vehicle drive wheel, wherein the only operative connections between the hydrostatic pump and the rest of the hydraulic system are a case drain which directs fluid into the second return line, and an operative connection between the charge pump and the hydrostatic pump for directing fluid to the hydrostatic pump to replace fluid which has passed through the case drain.

22. A hydraulic system for a vehicle adapted for operating a plurality of reel mower cutting units and for driving at least one vehicle component, said vehicle including an engine carried near the front of the vehicle and which generates heat, said hydraulic system comprising:

a fluid reservoir located generally remotely from the engine and near the rear portion of the vehicle, an input line coupled with the reservoir for drawing fluid therefrom, a first pump means operatively coupled with the input line, and carried near the front portion of the vehicle, a first motor means operatively coupled with the first pump means and carried near the front portion of the vehicle for driving a reel mower, a branched hydraulic line for receiving fluid from the first motor means, and having first and second branches, the first branch being a first return line extending to the reservoir, a second pump means operatively coupled with the second branch, said second pump means being carried near the front portion of the vehicle and having a lower operating flow rate than the first pump means, a second motor means carried near the front portion of the vehicle and operatively coupled with the second pump means for driving said vehicle component, a second return line operatively coupled with the second motor means for receiving fluid therefrom, said second return line being operatively coupled with the input line for allowing said fluid from the second motor means to flow to the first pump means without first flowing to the reservoir, said first pump means having a higher operating flow rate than the second pump means to thereby continuously direct fluid through the first branch for returning said fluid to the reservoir to be cooled, and a hydrostatic pump is carried near the front portion of the vehicle for driving at least one vehicle drive wheel, wherein the only operative connection between the hydrostatic pump and the rest of the hydraulic system is a case drain which directs fluid into the second return line, and an operative connection between the charge pump and the hydrostatic pump for directing fluid to the hydrostatic pump to replace fluid which has passed through the case drain.

23. The invention of claim 1, wherein the second pump means is a charge pump, a hydrostatic pump carried by the vehicle is charged by the charge pump and drives at least one vehicle drive wheel and includes a case drain which directs fluid into the second return line.

24. The invention of claim 13, wherein the second pump means is a charge pump, hydrostatic pump carried by the vehicle is charged by the charge pump and drives at least one vehicle drive wheel and includes a case drain which directs fluid into the second return line.

25. The invention of claim 22, wherein the second pump means is a charge pump, a hydrostatic pump carried by the vehicle is charged by the charge pump and drives at least one vehicle drive wheel and includes a case drain which directs fluid into the second return.

26. The invention of claim 3, wherein the higher operating flow rate of the first pump serves to continuously draw relatively cool fluid through the input line from the fluid reservoir such that the temperature of the fluid within the system remains sufficiently cool during operation.

27. The invention of claim 8, wherein the higher operating flow rate of the first pump serves to continuously draw relatively cool fluid through the input line from the fluid reservoir such that the temperature of the fluid within the system remains sufficiently cool during operation.

28. The invention of claim 15, wherein the higher operating flow rate of the first pump serves to continuously draw relatively cool fluid through the input line from the fluid reservoir such that the temperature of the fluid within the system remains sufficiently cool during operation.

* * * * *

UNITED STATES PATENT AND TRADEMARK OFFICE

CERTIFICATE OF CORRECTION

PATENT NO. : 5,335,494

DATED : August 9, 1994

INVENTOR(S) : Andrew T. Benko et al.

It is certified that error appears in the above-indentified patent and that said Letters Patent is hereby corrected as shown below:

Column 5, line 49, delete "Mover" and insert therefore --mower--.

Column 8, line 49, after "return" insert --line--.

Signed and Sealed this

Twenty-fourth Day of January, 1995

Attest:

BRUCE LEHMAN

*Attesting Officer*

*Commissioner of Patents and Trademarks*